(12) United States Patent
Massaro et al.

(10) Patent No.: US 7,771,099 B2
(45) Date of Patent: Aug. 10, 2010

(54) ELECTRONIC DEVICE WITH BACKLIT DISPLAY

(75) Inventors: Kevin L. Massaro, Houston, TX (US); William Adam Gralewski, Houston, TX (US); Brittany Davis, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 210 days.

(21) Appl. No.: 11/799,273

(22) Filed: Apr. 30, 2007

(65) Prior Publication Data
US 2008/0266769 A1 Oct. 30, 2008

(51) Int. Cl.
*F21V 7/04* (2006.01)
(52) U.S. Cl. .................. 362/602; 362/26; 362/610; 362/615; 362/632
(58) Field of Classification Search .............. 362/23, 362/26, 27, 602, 610, 612, 615, 632, 800, 362/812
See application file for complete search history.

(56) References Cited

U.S. PATENT DOCUMENTS

| | | | |
|---|---|---|---|
| 6,277,312 B1 | 8/2001 | Hansen et al. | |
| 6,285,420 B1 * | 9/2001 | Mizumo et al. | 349/65 |
| 6,764,760 B2 | 7/2004 | Nishizawa et al. | |
| 6,796,669 B2 * | 9/2004 | Masuda | 362/616 |
| 6,889,456 B2 * | 5/2005 | Shibata et al. | 40/546 |
| 6,935,800 B2 | 8/2005 | Hetzel | |
| 6,971,758 B2 * | 12/2005 | Inui et al. | 362/602 |
| 6,977,808 B2 | 12/2005 | Lam et al. | |
| 2002/0093608 A1 | 7/2002 | Cole et al. | |
| 2006/0012949 A1 | 1/2006 | Hutchinson et al. | |
| 2006/0214322 A1 | 9/2006 | Liu et al. | |
| 2007/0026197 A1 | 2/2007 | Suga et al. | |

FOREIGN PATENT DOCUMENTS

| | | |
|---|---|---|
| JP | 11-338590 | 12/1999 |
| KR | 10-2001-0068683 | 7/2001 |
| WO | 03/015298 | 2/2003 |

OTHER PUBLICATIONS

DE Office Action dated Feb. 25, 2010, pp. 4.

* cited by examiner

*Primary Examiner*—Sandra L O'Shea
*Assistant Examiner*—Meghan K Dunwiddie

(57) ABSTRACT

An electronic device comprises a housing having a half-mirror region molded into the housing, and a light source disposed within the electronic device and configured to transmit light through the half-mirror region to an exterior of the housing.

32 Claims, 3 Drawing Sheets

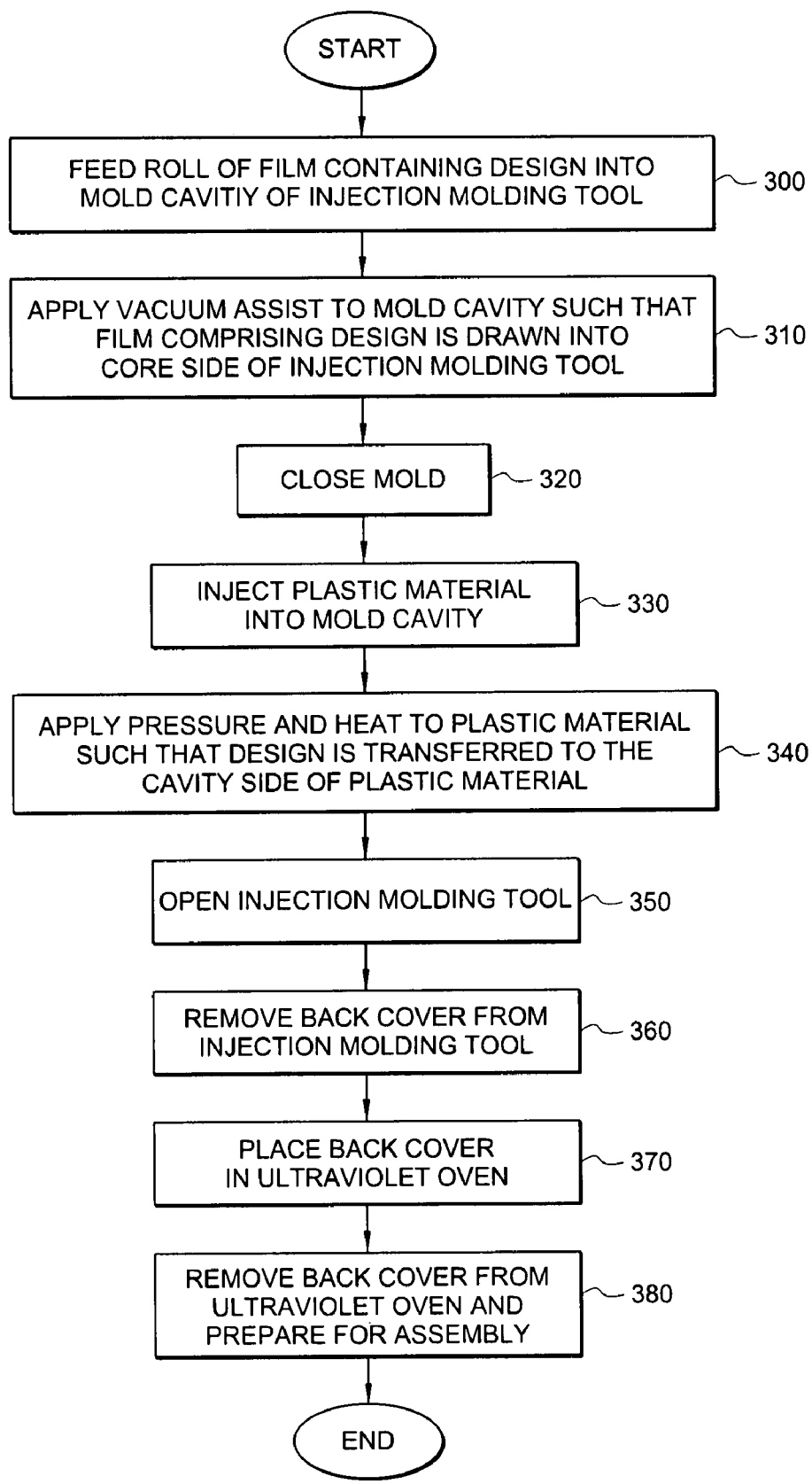

ELECTRONIC DEVICE WITH BACKLIT DISPLAY

BACKGROUND

Electronic devices sometimes contain images or logos indicating the source or manufacturer of the electronic device. For example, one type of electronic device comprises a frame having a translucent panel that is attachable to a display enclosure of a portable computer and that may be illuminated to display the logo/symbol. However, such types of displays require additional space to be allocated in the electronic device for such attachable elements, require additional assembly to manufacture, and result in additional cost.

BRIEF DESCRIPTION OF THE DRAWINGS

FIG. 3 is a flow diagram illustrating an embodiment of a method for manufacturing a backlit display for an electronic device.

DETAILED DESCRIPTION OF THE DRAWINGS

Figure 1:
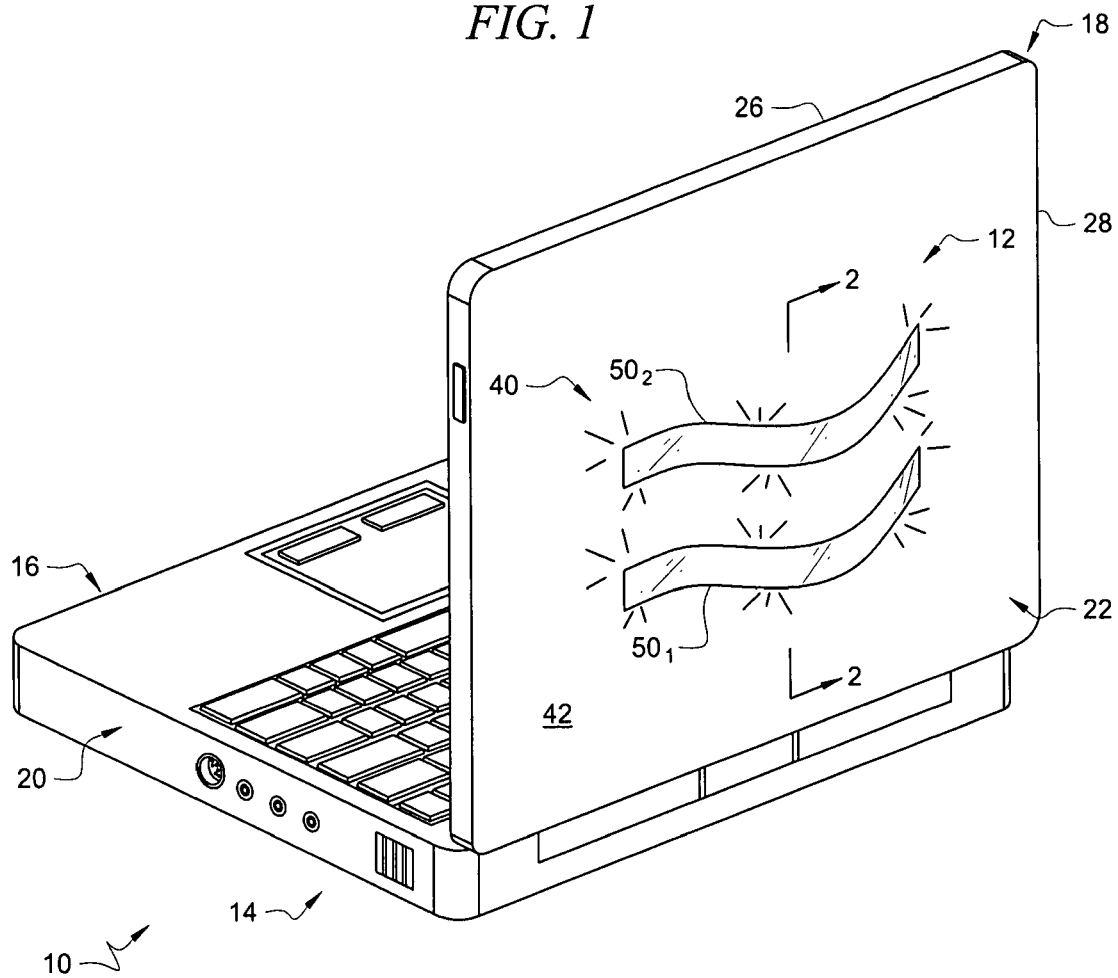
FIG. 1 is a diagram illustrating an electronic device in which a backlit display is employed to advantage.

FIG. 1 is a diagram illustrating an embodiment of an electronic device 10 in which a backlit display 12 is employed to advantage. In the embodiment illustrated in FIG. 1, electronic device 10 comprises a notebook computer 14 having a base member 16 rotatably coupled to a display member 18. However, it should be understood that electronic device 10 may comprise other types of devices such as, but not limited to, a tablet computer, a personal digital assistant, a gaming device, a media player, a desktop computer, a cellular telephone and/or any other type of portable or non-portable electronic device. In the embodiment illustrated in FIG. 1, base member 16 and display member 18 each comprise a housing 20 and 22, respectively, formed by a plurality of walls for supporting and/or otherwise storing various types of components of electronic device 10 therein. For example, in the embodiment illustrated in FIG. 1, housing 22 is used to supports a display screen for providing and/or otherwise displaying image content. In FIG. 1, housing 22 comprises a front cover 26 and a back cover 28. However, it should be understood that housing 22 and/or display member 18 may be otherwise configured.

In the embodiment illustrated in FIG. 1, backlit display 12 comprises a display element 40 located on a back wall 42 of housing 22. However, it should be understood that display element 40 may be otherwise located on electronic device 10 (e.g., located elsewhere on housing 22 and/or on housing 20). Display element 40 may comprise any type of logo, design, picture, illustration, graphic element or other type of illustrative element. In some embodiments, housings 20 and/or 22 are formed at least partially as a molded plastic component. For example, at least a portion of housings 20 and/or 22 may be formed from a plastic molded process such as, but not limited to, an in-mold-roll (IMR) or in-mold-decoration (IMD) process. In the embodiment illustrated in FIG. 1, display element 40 is molded into housing 22 such that display element 40 is an integral component and/or embedded design in housing 22.

In some embodiments, display element 40 is formed and/or otherwise molded into housing 22 as a half-mirror region 50 of housing 22 such that light emitted by a light source disposed within display member 18 is emitted through half-mirror region 50 to an exterior of electronic device 10. However, in some embodiments, half-mirror region 50 is configured such that in the absence of a light being transmitted through half-mirror region 50 from an interior of electronic device 10, housing 22 appears as an ordinary plastic housing 22 (e.g., in some embodiments, without any appearance of display element 40). In FIG. 1, two half-mirror regions $50_1$ and $50_2$ are illustrated; however, it should be understood that a greater or fewer quantity of discrete and/or joined half-mirror regions 50 may be used. Further, it should be understood that in some embodiments, even in the absence of a light being transmitted through half-mirror region 50 from an interior of electronic device 10, display element 40 may be visible from an exterior of electronic device.

Figure 2:
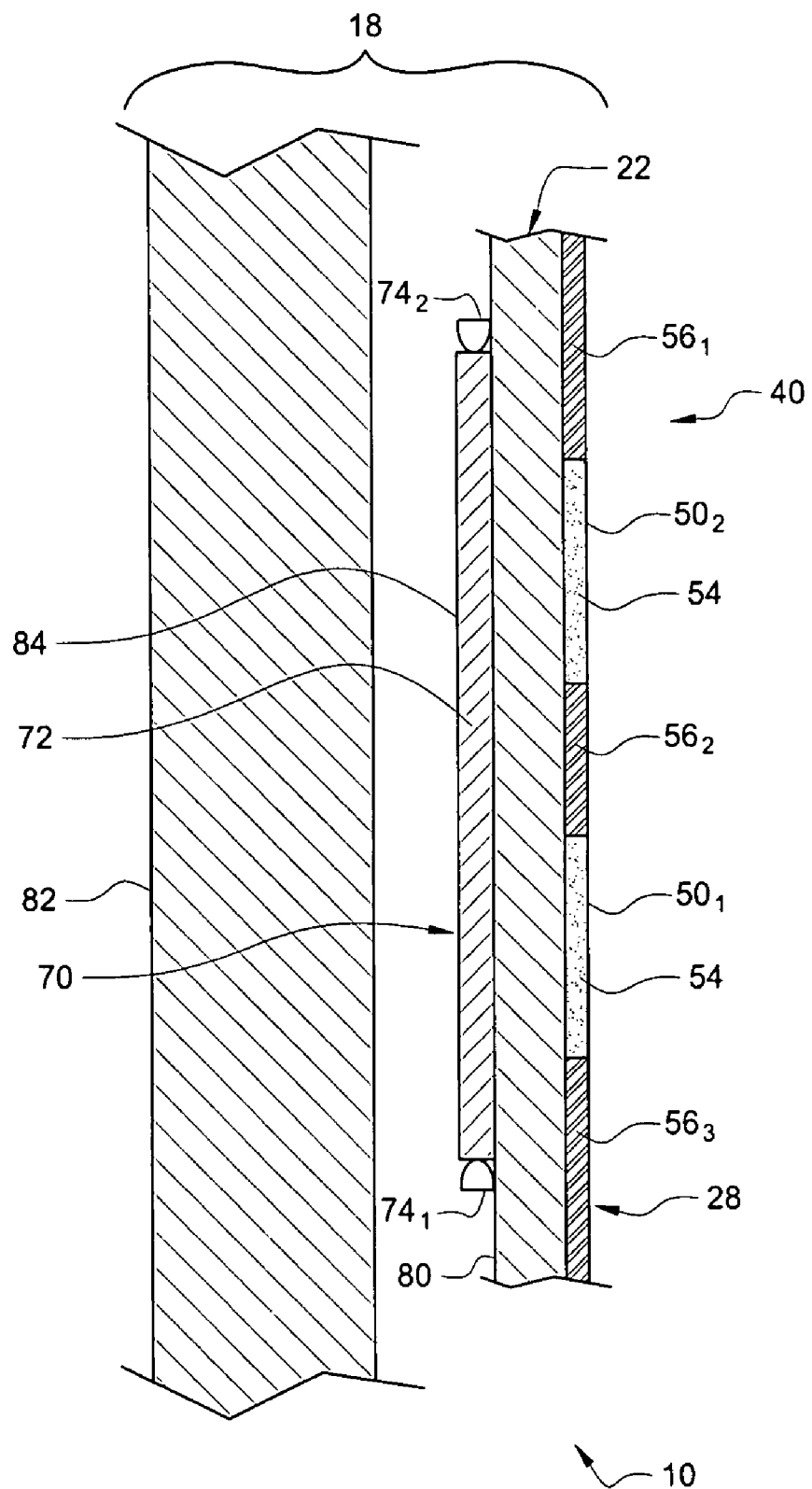
FIG. 2 is a diagram illustrating a section view of the electronic device and backlit display of FIG. 1 taken along the line 2-2 of FIG. 1.

FIG. 2 is a diagram illustrating a section view of electronic device and backlit display 12 of FIG. 1 taken along the line 2-2 of FIG. 1. In the embodiment illustrated in FIG. 2, half-mirror regions $50_1$ and $50_2$ comprise an opaque particles 54 molded into housing 22. For example, in some embodiments, half-mirror region(s) 50 are formed by having opaque particles 54 molded into back cover 28 using an IMD or IMR process. In operation, a film or other type of carrier having opaque particles 54 disposed thereon is threaded inside a mold cavity of an injection molding tool. In some embodiments, a clear and/or transparent thermoplastic or resin is then injected into the mold cavity, and the injection molding tool applies pressure and heat to change the thermoplastic or resin into a plastic component shaped according to the mold cavity (e.g., the shape of back cover 28). As the heat is applied, opaque particles 54 is transferred from the film to the thermoplastic or resin forming back cover 28. In transferring, opaque particles 54 is either folded into the thermoplastic or resin or applied to one edge or surface 42 (FIG. 1) of back cover 28. Opaque particles 54 may comprise any type of opaque material including metal such as, but not limited to, tin, gold, aluminum, chromium, a metal alloy, or any combination thereof.

In some embodiments, the film and/or carrier carrying opaque particles 54 for the molding process may also be used to carry inks and/or other materials used to provide color and/or a desired surface finishes to housing 22. For example, in the embodiment illustrated in FIG. 2, inks $56_1$-$56_3$ are molded into housing 22 (e.g., at the same time half-mirror regions $50_1$ and $50_2$ are formed). However, it should be understood that colors and/or surface finishes may be applied and/or otherwise formed during different stages of housing 22 formation. In some embodiments, opaque particles 54 and inks $56_1$-$56_3$ comprise the same or similar color, thereby resulting in half-mirror region(s) 50 being indiscernible (or at least partially indiscernible) from a remaining portion of housing 22 when a light is not being transmitted through half-mirror region(s) 50 from an interior of electronic device 10. However, it should be understood that housing 22 may be otherwise configured.

In some embodiments, half-mirror region(s) 50 are formed by providing opaque particles 54 at a density less than an opaque-level density such that light can be emitted through half-mirror region(s) 50 from a light source 70 disposed within display member 18. For example, in some embodiments, opaque particles 54 are disposed and/or otherwise molded into housing 22 at a predetermined density (e.g., 75%-85%) relative to the clear/transparent polymer/resin such that light can be emitted through half-mirror region(s) 50 from light source 70. Thus, in some embodiments, opaque particles 54 are transferred and/or otherwise molded into housing 22 at a partial and/or reduced density to enable light from light source 70 to pass therethrough. Thus, in some embodiments, half-mirror region(s) 50 is/are integral with housing 22 (e.g., formed as a unitary piece).

In the embodiment illustrated in FIG. 2, light source 70 comprises a light guide 72 configured to direct light received from one or more light emitting diodes (LEDs) 741 and 742 through half-mirror region(s) 50. In FIG. 2, light guide 72 is disposed between an internal surface 80 of back cover 28 and a display screen 82 of display member 18. Additionally, in FIG. 2, two LEDs 74 are illustrated; however, it should be understood that a greater or fewer quantity of LEDs may be used, or a type of light source different than LEDs may be used (e.g., light from display screen 82). In some embodiments, light guide 72 comprises a reflective and/or diffusive layer 84 disposed on a side thereof opposite half-mirror region(s) 50 to facilitate directing light emitted by LEDs 74 through half-mirror region(s) 50. However, it should be understood that light guide 72 may be otherwise configured. Further, in FIG. 2, light guide 72 is illustrated as being spaced apart from display screen 82; however, it should be understood that in some embodiments, light guide 72 and display screen 82 and/or other components within display member 18 may abut each other. Light source 70 may be affixed and/or attached to back cover 28, attached to other structure residing in display member 18, or otherwise positioned/secured within display member 18. It should be understood that in some embodiments, light guide 72 may be omitted such that light from a different light source is used to pass through half-mirror region(s) 50, such as, but not limited to, light from display screen 82.

FIG. 3 is a flowchart illustrating an embodiment of a method of manufacturing electronic device 10 with backlit display 12. The method begins with block 300 in which a film comprising a desired design using opaque particles 54 is feed into a mold cavity for an injection molding tool. Vacuum metallization is a process of applying a thin coat of metal to a plastic. Thus, in some embodiments, metallic, or a combination of metallic and non-metallic, opaque particles 54 are vacuum metalized and applied to the film in the form of a desired design which is then feed into the mold cavity. In this embodiment, the mold cavity is used to form at least a portion of back cover 28 for electronic device 100. It should be noted, however, that the mold cavity can be used to form any component for electronic device 10.

A vacuum assist is then applied to the mold cavity such that the film comprising the desired design is drawn into the core side of the injection molding tool (block 310). The core side is the female component of the mold cavity. The injection molding tool is then closed (block 320) and a plastic material is injected into the mold cavity (block 330). In some embodiments, the plastic material is a clear/transparent polymer (transparent or substantially transparent) to enable light to pass therethrough in the locations of half-mirror region(s) 50; however, it should be understood that plastics/resins being somewhat translucent when cured may also be used such that a sufficient level of transmissivity is provided to enable light to pass therethrough in the locations of half-mirror region(s) 50. Pressure and heat are then applied to the plastic material such that desired design is transferred to the cavity side of the plastic material (block 340). Opaque particles 54 are either folded into or melted into the thermoplastic or resin, thereby forming a permanent bond between the thermoplastic or resin and opaque particles 54. Back cover 28 is then formed.

The injection molding tool is then opened (block 350) and back cover 28 is removed from the injection molding tool (block 360). Back cover 28 is then placed in an ultraviolet oven (block 370). Back cover 28 is then removed from the ultraviolet oven and prepared for further assembly in electronic device 100 (block 380), such as the placement or assembly of light source 70 to back cover 28 and/or the assembly of back cover 28 with front cover 26 to form housing 22.

Thus, embodiments of backlit display 12 enable any type of graphical/design element 40 to be molded into and/or otherwise form part of housing 20 and/or 22 to enable such display element 40 to be backlit using light source 70. In some embodiments, display element 40 is formed as a half-mirror region 50 that enables light to pass therethough in one direction (e.g., from an interior area of electronic device through regions (50) to an exterior of electronic device 10) while, because of the density of opaque particles 54, the lack of light within display member 18 or other element of electronic device 10 to which region(s) 50 are located when light source 70 is not illuminated, or otherwise, the visibility through region(s) 50 from an exterior of electronic device is substantially impeded and/or otherwise resulting in negligible recognition of anything located within electronic device 10.

What is claimed is:

1. An electronic device, comprising:
   a display member that includes a display screen, a housing located on an opposite side of the display screen and having an opaque region and a half-mirror region molded into the housing, and a light source located between the display screen and the housing and transmitting light through the half-mirror region to illuminate a display element on an exterior surface of the housing.

2. The device of claim 1, wherein the light source comprises a light guide.

3. The device of claim 1, wherein the half-mirror region comprises a metal molded into the housing at a density less than an opaque-level density of the opaque region.

4. The device of claim 1, wherein the half-mirror region is formed in the housing an in-mold decoration (IMD) process.

5. The device of claim 1, wherein the half-mirror region is visibly indiscernible from the opaque region of the housing when the light is not being transmitted through the half-mirror region.

6. The device of claim 1, wherein the light source comprises a light guide configured to direct light from at least one LED through the half-mirror region.

7. The device of claim 1, wherein the half-mirror region includes opaque particles molded into the housing, and the opaque region includes inks molded into the housing at a same time the half-mirror region is formed.

8. The device of claim 1, wherein the electronic device comprises at least one of the group of a notebook computer, a cellular telephone, a personal digital assistant, a tablet computer, and a gaming device.

9. The device of claim 1, wherein the half-mirror region comprises a metal molded into a transparent resin.

10. The device of claim 1, wherein the display element is a logo.

11. A method for manufacturing an electronic device, comprising:
    providing a display member that includes a display screen, a housing located on an opposite side of the display screen and having a half-mirror region molded into the housing and an opaque region, and a light source that transmits light through the half-mirror region to illuminate a display element on an exterior surface of the housing.

12. The method of claim 11, further comprising providing the housing having the half-mirror region formed of a metal material.

13. The method of claim 11, further comprising disposing the housing in at least one of the group of a notebook computer, a cellular telephone, a personal digital assistant, a tablet computer, and a gaming device.

14. The method of claim 11, wherein the half-mirror region comprises a metal molded into the housing at a density less than an opaque-level density of the opaque region.

15. The method of claim 11, wherein the half-mirror region is partially visibly indiscernible from the opaque region of the housing when the light is not being transmitted through the half-mirror region.

16. The method of claim 11, further comprising providing the housing having the half-mirror region formed by an in-mold decoration (IMD) process.

17. The method of claim 11, wherein the half-mirror region includes opaque particles molded into the housing, and the opaque region includes inks molded into the housing at a same time the half-mirror region is formed.

18. The method of claim 11, wherein the light source comprises a light guide in the electronic device configured to direct light from at least one LED through the half-mirror region.

19. The method of claim 11, further comprising providing the housing having the half-mirror region formed of a metal material molded into a transparent resin.

20. An electronic device, comprising:
a display screen;
a housing supporting the display screen and including an opaque region and a half-mirror region molded into the housing; and
a light source that transmits light through the half-mirror region to illuminate a display element formed in the housing, wherein the half-mirror region includes opaque particles molded into a resin at a density less than an opaque-level density of the opaque region.

21. The device of claim 20, wherein the half-mirror region is formed in the housing an in-mold decoration (IMD) process.

22. The device of claim 20 wherein the half-mirror region is formed in the housing by transferring the opaque particles from a film into the resin during a molding process.

23. The device of claim 20, wherein the lights source is a light guide that is located between the display screen and the housing.

24. The device of claim 20, wherein the electronic device comprises at least one of the group of a notebook computer, a cellular telephone, a personal digital assistant, a tablet computer, and a gaming device.

25. The device of claim 20, wherein the opaque particles comprise metal particles.

26. The device of claim 20, wherein the half-mirror region is at least partially visibly indiscernible from the opaque region of the housing when the light is not being transmitted through the half-mirror region.

27. An electronic device, comprising:
a display screen;
a housing located on an opposite side of the display screen, formed at least partially from a transparent resin, and having a quantity of opaque material disposed in a half-mirror region in a density to enable light to transmit through the half-mirror region to illuminate a display element in the housing; and
a light source that transmits light through the half-mirror region to an exterior of the housing, wherein the half-mirror region includes opaque particles molded into a resin at a density less than an opaque-level density.

28. The device of claim 27, wherein the opaque material comprises a metal material.

29. An electronic device, comprising:
a housing at least partially formed from a transparent resin, the housing having a quantity of an opaque material disposed in a portion thereof in a density to enable light to be transmitted through the portion, wherein the opaque material is folded or melted in the transparent resin during injection molding of the housing,
wherein inks provide color to the housing, and the inks are molded into the housing at a same time the opaque material is folded or melted in the transparent resin.

30. An electronic device, comprising:
a housing at least partially formed from a transparent resin, the housing having a quantity of an opaque material disposed in a portion thereof in a density to enable light to be transmitted through the portion, wherein the opaque material is folded or melted in the transparent resin during injection molding of the housing,
wherein inks provide color to the housing, and the inks and the opaque material have a same or similar color resulting in a half-mirror region being molded into the housing and being indiscernible from a remaining portion of the housing when light is not being transmitted through the half-mirror region.

31. The device of claim 27, wherein the half-mirror region is at least partially visibly indiscernible from other portions of the housing when the light is not being transmitted through the half-mirror region.

32. The device of claim 27 wherein the light source is a light guide that extends between the housing and the display screen.

* * * * *

UNITED STATES PATENT AND TRADEMARK OFFICE
CERTIFICATE OF CORRECTION

PATENT NO.         : 7,771,099 B2                             Page 1 of 1
APPLICATION NO.    : 11/799273
DATED              : August 10, 2010
INVENTOR(S)        : Kevin L. Massaro et al.

It is certified that error appears in the above-identified patent and that said Letters Patent is hereby corrected as shown below:

In column 4, line 36, in Claim 4, delete "housing an" and insert -- housing using an --, therefor.

In column 5, line 37, in Claim 21, delete "housing an" and insert -- housing using an --, therefor.

Signed and Sealed this
First Day of March, 2011

David J. Kappos
*Director of the United States Patent and Trademark Office*